(12) United States Patent
Tamamura

(10) Patent No.: US 6,691,420 B2
(45) Date of Patent: Feb. 17, 2004

(54) LASER LINE BEAM EMITTING APPARATUS HAVING A MECHANISM FOR AUTOMATIC LOCATION OF A TILTED LASER UNIT HOLDER TO A DESIRED POSITION

(75) Inventor: Akihito Tamamura, Sabae (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 103 days.

(21) Appl. No.: 10/161,587

(22) Filed: Jun. 3, 2002

(65) Prior Publication Data

US 2003/0229996 A1 Dec. 18, 2003

(51) Int. Cl.[7] .......................... G01C 15/14; G01C 5/02
(52) U.S. Cl. ............................................. 33/286; 33/345
(58) Field of Search ............................ 33/286, 227, 228, 33/281, 282, 283, 285, 290, 291, 344, 345, 397, 402

(56) References Cited

U.S. PATENT DOCUMENTS

| 5,184,103 A | | 2/1993 | Gadreau et al. | |
| 5,521,573 A | | 5/1996 | Inoh et al. | |
| 5,524,352 A | * | 6/1996 | Rando et al. | 33/291 |
| 5,619,802 A | * | 4/1997 | Rando et al. | 33/291 |
| 5,680,208 A | * | 10/1997 | Butler et al. | 33/295 |
| 5,952,909 A | | 9/1999 | Umeno et al. | |
| 6,000,128 A | | 12/1999 | Umeno et al. | |
| 6,281,779 B1 | | 8/2001 | Matsumoto et al. | |
| 6,625,895 B2 | * | 9/2003 | Tacklind et al. | 33/286 |

FOREIGN PATENT DOCUMENTS

| JP | 10-176924 | 6/1998 |
| JP | 11-3115516 | 11/1999 |

* cited by examiner

Primary Examiner—Christopher W. Fulton
(74) Attorney, Agent, or Firm—Welsh & Katz, Ltd.

(57) ABSTRACT

A laser line beam emitting apparatus provided hereto has accommodations of rough handling or quick operations, preferable for construction sites in use, having a gimbals mechanism, and a laser unit holder swingy held by the mechanism and having at least one laser unit provided thereto, wherein a mechanism for performing automatic relocation of the tilted holder to its desired position is provided. The mechanism for automatic location can perform from detection of the tilting to relocation of the tilted holder to its desired position at instant. It comprises a level sensor provided to the holder for detection of the tilting to output resultant signals, and a device for generation of thrust, which is constructed by a magnet and at least one coil circuit for generation of thrust going to a direction of elimination of tilting of the holder, wherein the signals from the sensor control conduction to the coils.

16 Claims, 4 Drawing Sheets

LASER LINE BEAM EMITTING APPARATUS HAVING A MECHANISM FOR AUTOMATIC LOCATION OF A TILTED LASER UNIT HOLDER TO A DESIRED POSITION

FIELD OF THE INVENTION

The present invention relates to a laser line beam emitting apparatus, which is utilized for production of a vertical reference line drawn on a floor, a ceiling, and wall(s), and/or horizontal reference line drawn on wall(s), for, e.g., provision of a partition to divide a room. Particularly, the present invention relates to a laser line beam emitting apparatus having a mechanism for automatic location of a tilted laser unit holder to a desired position.

BACKGROUND OF THE INVENTION

Nowadays, the construction industry uses the laser line beam emitting apparatus in place of the marking (or ink pad) technique, which carpenters or construction workers measure the objectives by drawing a vertical or horizontal line on respective surfaces with a Chinese ink or chalk.

The laser line beam emitting apparatus performs emission of a vertical line beam passing a ceiling above and walls around it or a horizontal line passing walls around it.

For the carpenters or construction workers, such the linear light is a reference line, which allows for, for example, righting of a partition for division of a room.

The foregoing laser line beam emitting apparatus has a laser beam source, a collimator lens and a cylindrical road lenses allow for production of vertical or horizontal line beam from the laser line beam which of elliptical section. The vertical, and horizontal line beams are produced by the cylindrical rod lenses having axes level with, or plumb from the earth, respectively.

Such the laser line beam emitting apparatus has a laser unit in which a laser beam source and the collimator and cylindrical lenses are held. The apparatus has a gimbals mechanism by which a laser unit holder with the laser unit mounted thereto is held, and thus prevents tilting of the laser unit holder from its predetermined position or with respect to the desired angle where allows for accurate emission of the vertical or horizontal beam. Generally, for the prevention of tilting of the foregoing laser unit holder, the conventional laser line beams emitting apparatus has a passive construction such as gimbals mechanism by which the laser unit holder is held.

Alternatively, a conventional laser line beam emitting apparatus has a laser unit holder or laser head having a cylindrical lens and so on. It has an active construction such as the laser unit holder or laser head itself being controlled.

FIG. 5 shows, as an example of the prevention of tilting of the laser unit holder according to the conventional active control, a gyro mechanism having two drives. Such the two drives comprise respective motors, and shafts of the motors are at right to each other such that a laser unit holder 1 turns in directions parallel and perpendicular to a paper on which the drawing is shown. The laser unit holder 1 has two pins radially externally extending therefrom.

The first motor 3 is provided with a screw 4 formed on its leading shaft, the screw 4 has an engagement with a nut 5, and the nut 5 has folk parts 6 extending therefrom. The first pin 2 of the holder 1 has fitting between the folk parts 6. Hence, when turns of the screw 4 moves the nut 5 in a direction longitudinally of the screw 4, the folk parts 6 also move the first pin 2 in a direction longitudinally of the screw 4 so as to give the laser unit holder turn about a first shaft (not shown).

The second motor (not shown), which is of the same type as the first motor 3, gives the laser unit holder turn about a second shaft (not shown) passing an axis orthogonal to the foregoing fist shaft.

Such the conventional laser line beam emitting apparatus has a level sensor for detecting the tilted laser unit holder with respect to the predetermined position so as to output the detection for control of turns of respective first and second motors. Therefore, the retention of the oriented laser unit holder without tilt with respect to the desired angle is always made.

As an example, JP 11-176924, A discloses a laser line beam emitting apparatus which is of an active construction for prevention of tilt of a laser head. The apparatus has drive means which comprise two motors, a level sensor for sensing no horizontally thereof with respect to the vertical direction, and a signal processing circuit for controlling respective motors. The controlled motors orient the laser head in the direction of X and Y axis in accordance with the sensing of no horizontality by the level sensor, and thus the laser head is positioned at the predetermined location.

JP 11-311516, A is also given as example of a laser line beam emitting apparatus like the foregoing construction.

For the prevention of tilting of the laser source unit according to other prior arts except for the foregoing construction, a laser line beam emitting apparatus has a tripod having gotten long and short through its screw. As an idea, a motor gives the screw of the tripod turn, a level sensor controls the turn of the motor, and thus the retention of the oriented laser unit holder without tilt with respect to the desired angle is performed.

In the conventional laser line beam emitting apparatus which is of passive retention of the oriented laser unit holder in the desired location, both of the levelness and plumbness of the produced laser line beam depend on sensitivity of the gimbals mechanism. Therefore, if the gimbals mechanism has higher mechanical resistance, it is difficult to obtain a precisely horizontally or vertically drawn laser line beam. The solution requires technically skilled adjustment of sensitivity. It also requires provision of a high precise and expensive bearing with higher shock and wear resistance to the gimbals mechanism, because of the laser unit holder throwing high load on the bearing.

On the other hand, in the active retention of the oriented laser unit holder in the desired location by control of the two motors, correction for tilting of the laser unit holder is performed by a combination of the level sensor for detecting the tilting for output of signals, and the motors for giving the screw turns for movement of the laser unit holder in accordance with the output signals. In this case, required time from the detection of tilting to the corrected location is too long, since movement of the laser unit holder is given by the screws turning through a motor. Such the laser line beam emitting apparatus has a slow response to tilting of the laser unit holder with respect to the desired location, and thus does not go over construction sites where it is roughly handled and which desire the quick operations.

SUMMARY OF THE INVENTION

In order to accomplish solution of the foregoing problems as caused by prior arts, the present invention provides as its objects a laser line beam emitting apparatus having a mechanism for automatic precise location of the tilted laser unit holder to a desired position. The laser line beam emitting apparatus according to the present invention allows elimination of difficulty in obtainment of a horizontally or vertically drawn laser line beam as caused by the conventional one, and has no requirement of the skilled adjustment of sensitivity, and adoption of the expensive bearing.

In addition, the foregoing mechanism of the laser line beam emitting apparatus according to the present invention can have accommodation of rough handling and quick operations, preferable to construction sites.

The laser line beam emitting apparatus according to the present invention may have double adjustment of location of the laser unit holder to the desired position which allows production of laser line beam(s) with precise level and plumb emission with respect to the earth.

The first adjustment, which is rough one, is performed by use of conventional gimbals mechanism by which the laser unit holder is held. The second adjustment, which is fine one, is performed by a level sensor and a device for generation of thrust.

The level sensor comprises a casing, a laser diode, a collimator lens, a reservoir with liquid and bubble at the center thereof, and a photo acceptance unit. The level sensor is mounted to the laser unit holder such that its components are arranged in series from down to up therein. A level sensor as disclosed by JP 11-176924, A or JP 11-311516, A may be employed.

The level sensor may sense the tilting of the laser unit holder through laser beam(s) emitted from the laser diode and collimated through the collimator lens. When the laser unit holder is tilted, the collimated, emitted laser beam(s) reach a position distant from the center of the photo acceptance unit because of refraction by the bubble in the reservoir. Resultant tilting signals from the photo acceptance unit are outputted to the device for generation of thrust.

The device for generation of thrust comprises at least one magnet, and a plurality of coils, and performs maintained location of the laser unit holder to the desired position in accordance with conduction to the coils, controlled by the output signals from the level sensor.

The laser line beam emitting apparatus according to the present invention may have a gimbals mechanism having a laser unit holder swingy held by respective shafts thereof orthogonal to each other. In this case, the device for generation of thrust gives bidirectional thrusts such that each of the laser unit holder swings in respective directions of elimination of the tilting.

Such the device for generation of thrust has a first coil which comprises a coil for generation of thrust going to one direction, a second coil which comprises a plurality of coils for generation of thrust going to another direction, and a magnet causing magnetic flux to be produced such that the thrusts pass across respective first and second coils.

According to the present invention, the magnet of the device for generation of thrust is provided to the base of the laser line beam emitting apparatus, while both of the first and second coils are provided to the laser unit holder.

Alternatively, the former is provided to the base of the laser line beam emitting apparatus, while the latters are provided to the laser unit holder.

Such the coil in use for the thrust generator includes not only a winding coil as reminded of the wound conductive wire, but also a printed coil substrate comprising a substrate with one or more layers, and a conductive material printed in a form of a winding pattern on or in respective substrates.

In this case, both or one of the first and second coils may be of printed coils, respectively. In addition, when both of the first and second coils are of respective printed coils for provision of the generated thrust in both of the forgoing directions, a single substrate may have both of the winding patterns of respective first and second coils. The device for generation of thrust has no limitation in the number of the winding pattern, with the generated thrust for position of the laser unit holder to the desired location.

In other words, the printed coil substrate according to the present invention may be constructed by ones disclosed in e.g. U.S. Pat. Nos. 6,281,779, 6,000,128, 5,952,909, 5,521,573, and 5,184,103.

According to the present invention, each of the gimbals mechanism and device for generation of thrust may be of adjustment in corrected location of the laser unit holder in only one direction.

Thus, the maintenance of location of the laser unit holder at the predetermined position by the controlled conduction to the coils and combined magnet of the device for generation of thrust, in accordance with the output signals from the level sensor, allows precisely actively plumbing up and leveling up of the laser unit holder. This eliminates requirement of works to adjust location of the laser unit holder with sensitivity of experienced skills, and permits an inexpensive bearing to be adopted.

Furthermore, a performance of the adjusted location of the laser unit holder by use of the device for generation of thrust which comprises the magnet and coils allows instant operations from the detection of tilting to the elimination of tilting of the laser unit holder. This gives a laser line beam emitting apparatus enough accommodation of use at construction sites and so on having a tendency of the rough handling thereof and a preference of the quick operations thereof.

PREFERRED EMBODIMENTS OF THE INVENTION

Description will now be made in embodiments of a laser line beam emitting apparatus having a mechanism for automatic location of the tilted laser source unit to a desired position in accordance with the present invention, with reference to the accompanying drawing.

Figure 1:
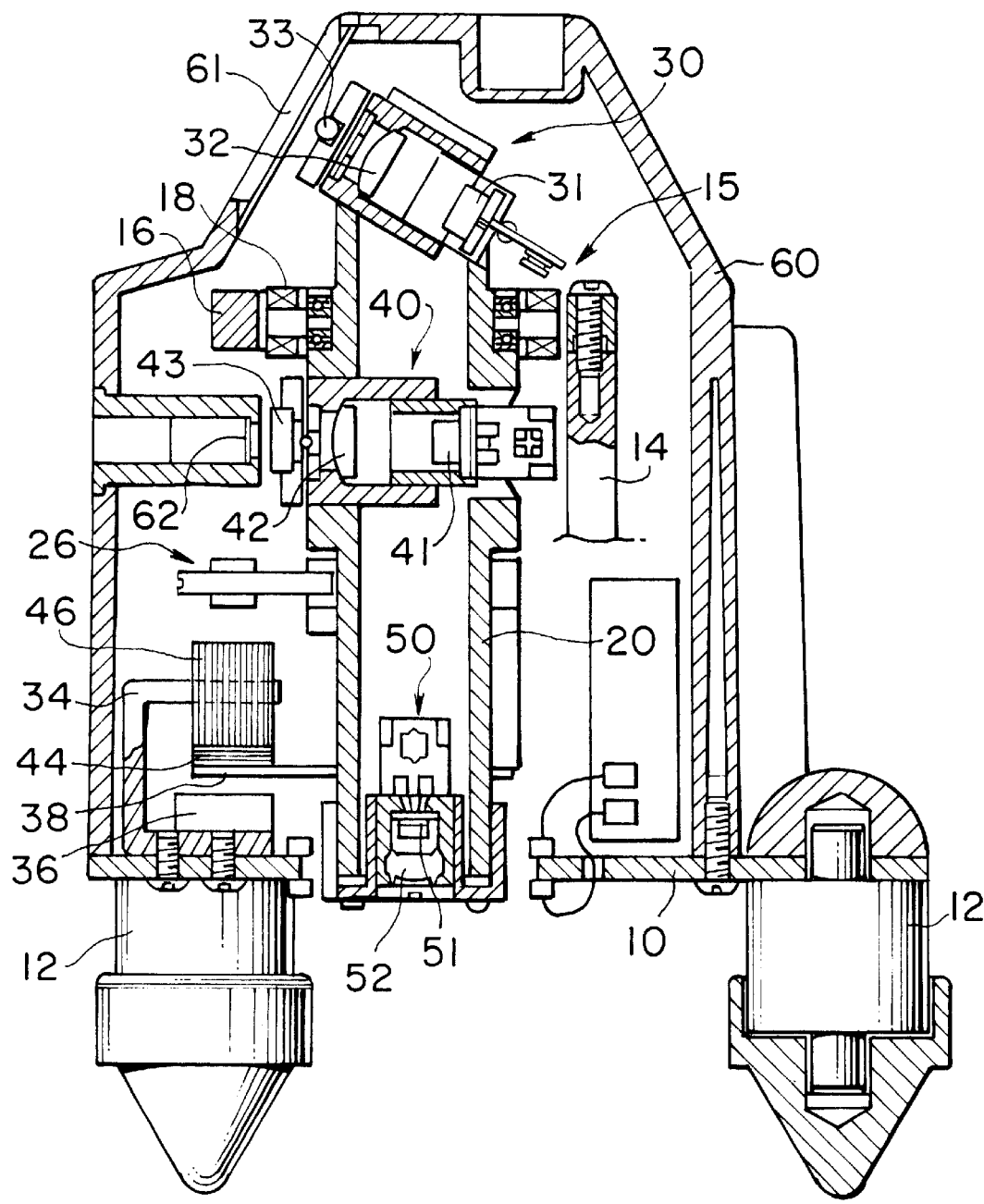
FIG. 1 is a sectional side view of a mechanism for automatic location of a swinging laser unit holder of a laser line beam emitting apparatus according to an embodiment of the present invention.

Referring to FIG. 1, the laser line beam emitting apparatus has a base plate 10, and a cover member 60 disposed on the base plate 10. The base plate 10 is supported and maintained in its leveled position by three legs 12. On the front surface of the base plate 10, there are several columns 14 that vertically stand therefrom.

Figure 2:
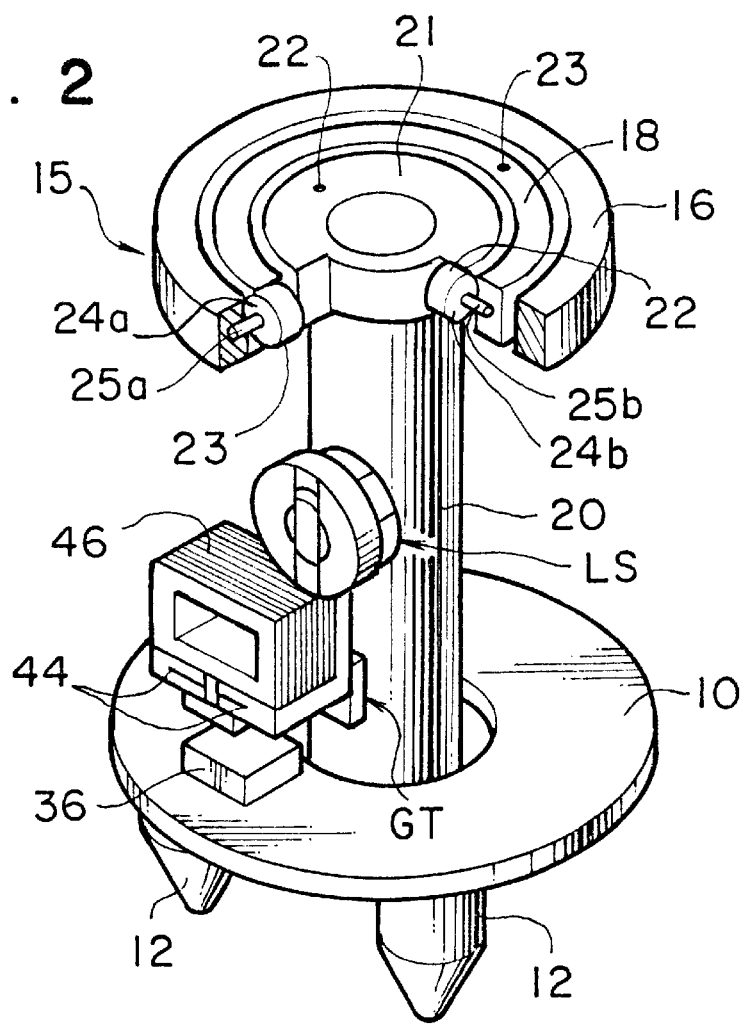
FIG. 2 is an oblique perspective view of a part of gimbals mechanism and device for generation of thrust according to the foregoing embodiment.

A laser unit holder 20 is hung from a gimbals mechanism 15, and is cylindrically shaped with an outward flange 21 formed at the top portion, as shown in FIGS. 1 and 2. The gimbals mechanism 15 comprises an outer ring 16, and an inner ring 18 inside of the outer ring 16. There is a pair of first bearings 23, 23 provided in the inner ring 18, and a pair of second bearings 22, 22 provided in the outward flange 21 so that the inner ring 18 and the laser unit holder 20 have possible rotations through respective rollers 24a, 24b fitted on horizontal shafts 25a orthogonal to horizontal shafts 25b.

Turning to FIG. 1, the laser unit holder 20 has first, second and third laser units 30, 40 and 50. The first, second and third laser units 30, 40 and 50 are employed for productions of vertical (plumb) and horizontal (level) laser line beams, and a laser beam made on a reference mark formed on a floor, respectively.

The first laser unit 30 for vertically emitted laser beam is mounted to the laser unit holder 20 at the top portion of the laser unit holder 20, wherein a laser diode 31 for emission of laser beam(s), a collimator lens 32 for collimating the emitted laser beam(s), and a rod lens 33 into which the collimated laser beam(s) acre oriented, are arranged in series from down to up so that the laser line beam emitting apparatus provides production of a laser line beam continuously drawn on objects asides of, below and above it.

The second laser unit 40 for horizontally emitted laser beam is mounted to the laser unit holder 20 at the approximate middle portion of the laser unit holder 20, wherein a laser diode 41 for emission of the laser beam(s), a collimator lens 42 for collimating the emitted laser beam(s), and a rod lens 43 for horizontally drawing of the collimated laser beam(s) are arranged in series from right to left or left to right on the horizontal so that the laser line beam emitting apparatus provides production of a horizontal laser line beam continuously drawn on objects ahead, behind and right and left asides of it.

The third laser unit 50 for laser beam on the earth is mounted to the laser unit holder 20 at the lower portion thereof, wherein a laser diode 51 for emission of laser beam(s), and a collimator lens 52 for collimating the emitted laser beam(s) are vertically arranged in series from up to down so that the laser line beam emitting apparatus provides production of a laser beam spot made just under it. The first, second, and third laser units 30, 40, 50 are fitted in respective cylinders whose internal surfaces are formed with a mirror, respectively.

In the laser line beam emitting apparatus according to the present invention, the cover member 60 has elongate outlets 61 and 62 for prevention of interruption of respective vertical and horizontal laser beams.

Such the laser line beam emitting apparatus may perform corrections of wrong balance of the laser unit holder 24 by a conventional balance mechanism (gimbals mechanism) and also provides a mechanism for automatic location of the tilted laser unit holder in a desired position as described below.

Referring to FIGS. 1, 2 and 3, the mechanism for automatic correction of the tilted laser unit holder to a desired position comprises a device for generation of thrust that allows for maintenance in location of the laser unit holder at the desired position, and a level sensor for detecting the tilted laser unit holder.

The device for generation of thrust GT is mounted on the periphery of the laser unit holder 20 at the lower portion. It has a plate 38 disposed on the laser unit holder 20 at the position protruding from the periphery thereof, a pair of first coils 44, 44 fixedly mounted on the plate 38 for generation of thrust, a second coil 46 fixedly mounted on the first coils 44 for generation of thrust, an U-shaped yoke 34 that U-character turns clockwise by 90 degrees as arranged such that the left side of the U-character goes into the cored interior of the second coil 46 with enough gap, and a permanent magnet 36 fixedly disposed on the lower internal side of the turned U-character, as shown in FIGS. 1 and 2.

Figure 3A:
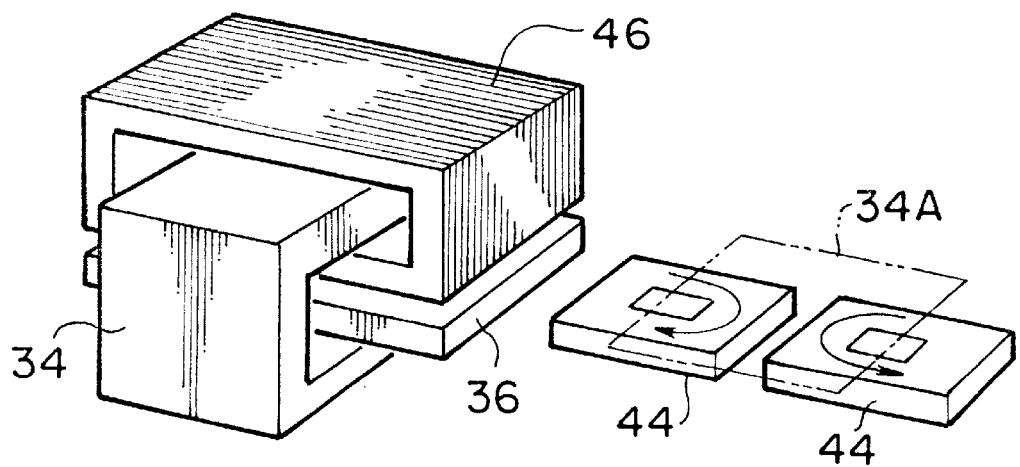
FIG. 3A is a sectional view of a part of the device for generation of thrust being disassembled, according to the foregoing embodiment.

As shown in FIGS. 2, 3A, the pair of first coils 44, 44, which are arranged on right and left sides from the center of the plate 38, comprise respective ones horizontally wound in opposed directions to each other. The second coil 46 comprises one wound vertical to the horizontal.

Figure 4:
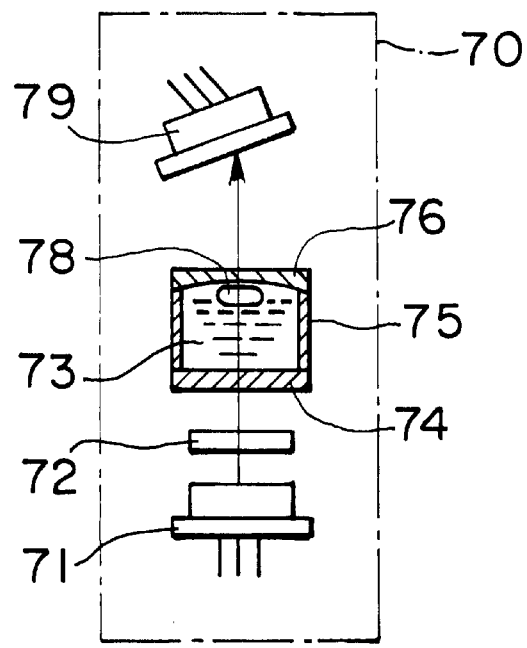
FIG. 4 is a schematic representation of optical arrangement of level sensor applicable to the present invention.
Figure 5:
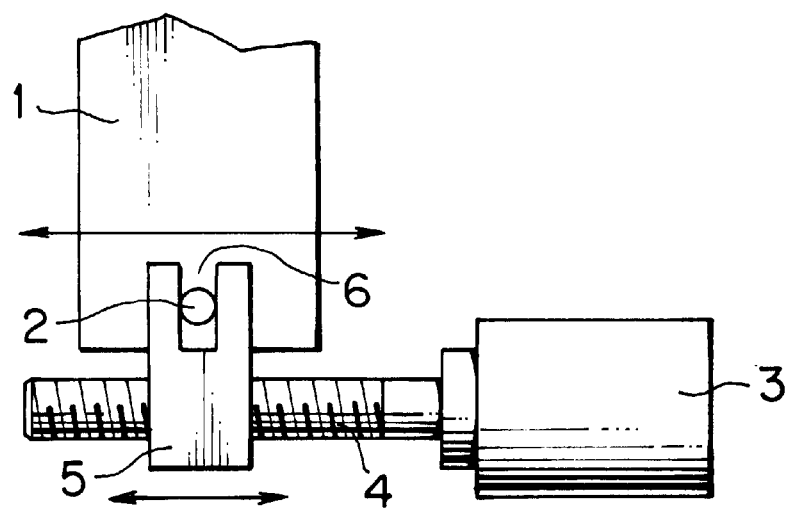
FIG. 5 is a side view of an example of active control mechanism for automatic location of a tilted laser unit holder of the conventional laser line beam emitting apparatus.

Referring to FIGS. 4 and 2, the level sensor LS is provided on the laser unit holder 20. It comprises a housing 70, a laser diode 71 for emission of laser beam, a collimator lens 72 through which the emitted laser beam(s) are collimated, a reservoir 75 and a photo acceptance unit 79 which are assembled into the housing 70, wherein the components assembled into the housing are arranged in series from down to up. The collimated, emitted laser beam(s) straightly go to the photo acceptance unit 79 thorough liquid 73 in the reservoir 75, and bubble 78 at the center thereof.

The reservoir 75 of the level sensor LS is formed in a shape having side, bottom and top plates. Both of the bottom and top plates 74, 76 of the reservoir 75 are of transparency, of which the top plate 76 is upwardly slightly curved for formation of an upward arc.

As stated above, the reservoir 75 receives liquid 73, and bubble 78 at the upper center therein. When the level sensor LS is at the predetermined position, such the bubble 78 is located centrally of the top plate 76 of the reservoir 75. However, if the level sensor LS is even slightly tilted, the bubble 78 is displaced from the reference position.

The laser unit holder 20 at the reference position gives the emitted laser beam(s) going in a straight line to the center of the photo acceptance unit 79 through the bubble 78. Whereas, the tilted level sensor LS produces the laser beam(s) reaching a position distant from the center of the photo acceptance unit 79, since it causes refraction of the emitted laser beam from the bubble 78 being displaced from the reference position.

The photo acceptance unit 79 has a photo acceptance part, which is divided into four elements which comprise respective well-known sensor. The photo acceptance unit 79 determines weather the level sensor is at the correct position, in accordance with outputs from respective sensors. Thus, the photo acceptance unit can obtain different outputs from respective sensors to know how the level sensor LS is tilted from the correct position. If the level sensor LS is tilted from the correct position, the photo acceptance unit 79 performs the resultant signal output to the control circuit (not shown) so that both of the foregoing coils 44, 46 are controlled by the control circuit.

As stated below, the laser line beam emitting apparatus according to the present invention may have double preventive functions 6f tilting of the laser unit holder.

When the laser line beam emitting apparatus is placed at the predetermined position of a work site, the laser unit holder 20 is pendant through the components of the gimbals mechanism 15.

A mechanism for balance adjustment 26 is also mounted to the periphery of the laser unit holder 24 for control of a balance of the laser unit holder 24 with the laser unit 30, 40, 50, coils 44, 46 and so on. The mechanism for balance adjustment 26 is constructed by e.g. screwed bar protruding from the laser unit holder 24 on the periphery thereof, and a weight having screw threads on which the screw of the bar is threaded.

However, the laser unit holder 20 often can not take up a position where it is precisely vertical, because of gimbals mechanism 15 having generation of mechanical resistance thereto and so on. Accordingly, such the gimbals mechanism only gives, preventive function of tilting of the laser unit holder 25 with short-lived effect The laser line beam emitting apparatus according to the present invention has a second preventive function of tilting of the laser unit holder 20. This preventive function can have subtle adjustment for correction of the slightly tilting of the laser unit holder 20.

Turning to FIG. 1, if the laser unit holder 24 is slightly tilted in a perpendicular direction with respect to the paper surface, the laser line beam(s) reach a position slightly distant from the photo acceptance unit 79. Hence, the photo acceptance unit 79 detects the displaced laser beam(s) so that the corresponding signals are outputted therefrom to the control circuit. The control circuit controls conduction to the coil 46 so that the forgoing device for generation of thrust performs the second preventive function as stated below.

As shown by a horizontal projection A of FIG. 3, the device for generation of thrust has magnetic flux passing through the area on the adjacent side of the pair of coils 44 to each other. The pair of first coils 44, 44 wound in opposed directions to each other are connected in series with each other. Thus, the conduction to the pair of first coils 44, 44 contributes to generation of thrust which is orthogonal to opposed sides of respective coils 44 to each other (in other words perpendicular to the paper surface on which FIG. 1 is made), going to the same direction.

Whereas, the coil 46 is wound around edges of a surface perpendicular to the magnetic flux surface area such that the magnetic flux passes the lower side thereof. Hence, the conduction to the second coil 46 contributes to generation of thrust which is orthogonal to the lower side of the second coil and goes to the horizontal in parallel with the paper surface of FIG. 1.

The generated thrusts of respective pair of first coils 44, 44 and second coil 46 produce movement of the laser unit holder 20 to the correct position through the bearing in the gimbals mechanism 15 so that location of the laser unit holder 20 at the desired position is maintained.

As stated above, the laser line beam emitting apparatus according to the present invention is provided with the device for generation of thrust, wherein the foregoing two thrusts orthogonal to each other are generated. The pair of first coils 44, 44 serve for generation of thrust in one direction (e.g., X direction), while the second coil 46 serves for generation of thrust in another direction (e.g., Y direction). The change in the orientation of the conduction to each of the first and second coils 44, 46 and flow of the current gives any change to the orientation and intensity of the foregoing two thrusts.

Figure 3B:
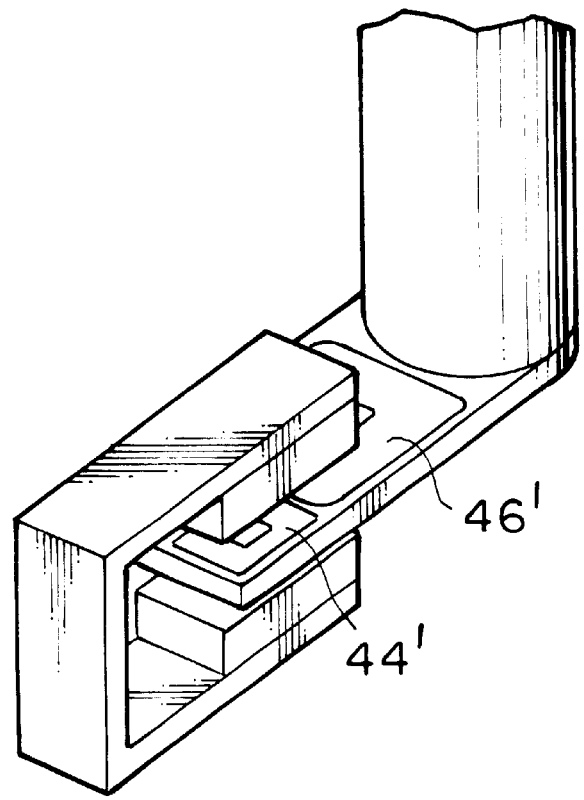
FIGS. 3B and 3C are perspective and top views of coils as constructed by a printed coil circuit, respectively.
Figure 3C:
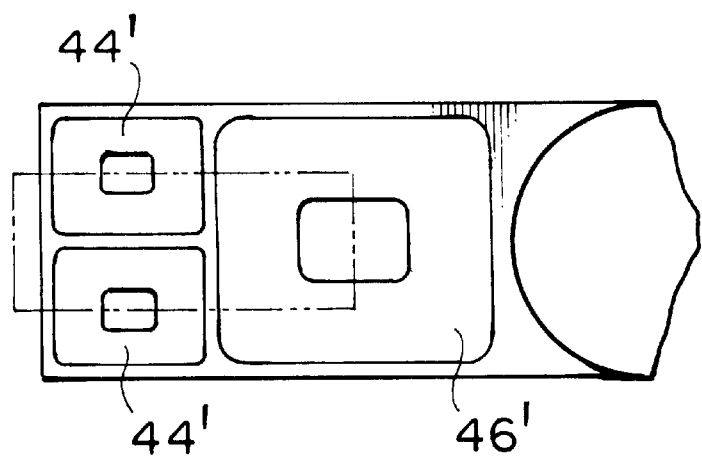

The pair of the first coils for generation of thrust in one directions, and the second coil for generation of thrust in the other directions may be, as shown in FIGS. 3B and 3C, of a printed coil substrate, a conductive material formed in one or more winding patterns on or in the printed substrate.

According to this embodiment, the printed coil substrate has first coils 44' for generation of thrust in one direction and a second coil 46' for generation of thrust in other direction. Such the print coil substrate may comprise a single layer or multi layers. The number of the winding pattern is not limited to three. All types of print coil substrates having generation of thrust in both of the directions are included.

Now, a description of the process between the detection of the tilting of the laser unit holder 24 by the level sensor and the generated thrust by the device for generation of thrust is given.

When the laser unit holder 20 is even slightly tilted in a perpendicular direction to the paper surface of FIG. 1, the photo acceptance device 79 of the level sensor can know the laser beam reaching a position distant from the predetermined one, for performance of output of signals corresponding to the displaced laser beam(s) to the control circuit therefrom. The control circuit controls conduction to the coils 44, 44 and 46, or 44'44' and 46' in accordance with the detected signals of the level sensor so that resultant thrust goes to the direction where the tilting of the laser unit holder 24 is eliminated.

Thus, as soon as the tilting of the laser unit holder 20 is detected, resultant thrust goes to the direction where the tilting is eliminated. This has the effect of correctly locating the tilted laser unit holder 20 due to even micro or quick vibrations and so on. Resultantly, the laser unit holder 20 always can be at the predetermined correct position with stability.

The prevention of tilting of the laser unit holder 20 by the device for generation of thrust GT allows the laser unit holder 20 to be constructed by adoption of a gimbals mechanism having a bearing with low cost, sturdiness and large mechanical resistance. In other words, the present invention allows constantly stable maintenance of fixed location of the laser unit holder 20 at the desired position, even though the laser unit holder 20 is combined with the gimbals mechanism 15 having a bearing that is sturdily built.

Accordingly, the present invention allows provision of a laser line beam emitting apparatus having enough permissible accommodation of rough utilization and handling and quick operations, preferable to the construction sites.

The fine adjustment of correct location of the tilted laser unit holder 20 by the device for generation of thrust GT is desired to be made, after the first adjustment by the gimbals mechanism 15, for example, after elapse of the predetermined time from released lock of the laser unit holder 20, or at the time when the tilting of the laser unit holder 20 becomes less than the predetermined one. Because operation of the device for generation of thrust GT at large tilting of the laser unit holder 20 causes comparatively large flow of the wasted current into the coils 44, 44 and 46 or 44'44' and 46'.

In the embodiment as illustrated in the drawings, the device for generation of thrust has both of functions associated with generations of respective thrusts going to one directions and the other directions orthogonal thereto. However, independent devices, which have functions associated with generations of respective thrusts going to one direction and another direction, may be mounted to respective positions.

Alternatively, the magnetic circuit may be constructed by a yoke and magnet fixed to the laser unit holder, and a coil fixedly mounted to the base.

Additionally, both or either of the gimbals mechanism and/or device for generation of thrust may have a function to adjust the tilting of the laser unit holder with respect to one direction.

What is claimed is:

1. A laser line beam emitting apparatus comprising:

a gimbals mechanism a laser unit holder swingy held by said gimbals mechanism and having at least one laser unit mounted thereto, a level sensor mounted to said laser unit holder for output of signals at the detection of tilting of said laser unit holder, and means for generation of thrust going to a direction of elimination of tilting of said laser unit holder, the means for generation of thrust comprising at least one magnet and at least one conductive material formed in a winding pattern, the output signals from said level sensor having a function to control conduction to said means for generation of thrust, whereby location of said laser unit holder to a desired position is maintained.

2. The laser line beam emitting apparatus of claim 1, said apparatus further comprising means for controlling a balance of said laser unit holder having said at least one laser unit, said level sensor and the components of said means for thrust of generation.

3. The laser line beam emitting apparatus of claim 1, wherein said gimbals mechanism has two shafts orthogonal to each other, said laser unit holder is swingy held by said two shafts of the gimbals mechanism, and said means for generation of thrust generates thrusts to cause the laser unit holder to be swung about each of said two shafts.

4. The laser line beam emitting apparatus of claim 1, wherein the conductive elements of said means for generation of thrust comprise a first conductive element formed in a first winding pattern for generation of thrust going to a first direction, and a plurality of second conductive elements formed in a second winding pattern for generation of thrust going to a second direction, and the magnet of said means for generation of thrust has produced magnetic flux to pass across respective first and second winding patterns.

5. The laser line beam emitting apparatus of claim 4, wherein said second conductive elements are paired, and the second conductive elements have winding patterns wound in the opposed directions to each other, respectively.

6. The laser line beam emitting apparatus of claim 4, wherein said laser line beam emitting apparatus has a base, said first and second conductive elements comprise respective coil devices provided to said laser unit holder, and said magnet is provided to said laser unit holder.

7. The laser line beam emitting apparatus of claim 4, wherein said laser line beam emitting apparatus has a base, said first and second elements comprise respective coil devices provided to said base, and said magnet is provided to the laser unit holder.

8. The laser line beam emitting apparatus of claim 4, wherein the first winding pattern of said first conductive element and/or the second winding pattern of said second conductive pattern are formed in or on at least one substrate which comprises one or more layers.

9. A laser line beam emitting apparatus comprising:

a laser unit holder having at least one laser unit mounted thereto, a gimbals mechanism to perform function of acting as plumbing up of said laser unit holder for a predetermined time period of or after elimination of swinging of said laser unit holder to over a predetermined angle, means for automatically locating said laser unit holder to a desired position after elapse of the predetermined period of or after the elimination, said means comprising a level sensor to output signals in accordance with tilting of said laser unit holder, and a device for generation of thrust going to a direction of elimination of tilting of said laser unit holder, the device for generation of thrust comprising at least one magnet and at least one coil, the output signals from said level sensor having a function to control conduction to said means for generation of thrust, whereby location of said laser unit holder to a desired position is maintained.

10. The laser line beam emitting apparatus of claim 9, said apparatus further comprising means for controlling a balance of said laser unit holder having said at least one laser unit, said level sensor, and the components of said means for generation of thrust.

11. The laser line beam emitting apparatus of claim 9, wherein said gimbals mechanism has two shafts orthogonal to each other, said laser unit holder is swingy held by said two shafts of the gimbals mechanism, and said means for generation of thrust generates thrusts to cause the laser unit holder to be swung about each of said two shafts.

12. The laser line beam emitting apparatus of claim 9, wherein at least one said coil of the means for generation of thrust comprises a first coil which comprises a wire wound thereto in a first direction so as to generate thrust going to the first direction, a second coil which comprises a plurality of wires wound thereto in a second direction different from said first direction, said first coil having a side located on said second coil, and a magnet to cause magnetic flux to be produced to pass across respective first and second coils.

13. The laser line beam emitting apparatus of claim 12, wherein said plural wires of the second coil comprise a clockwise wire and a counterclockwise wire.

14. The laser line beam emitting apparatus of claim 12, wherein said laser line beam emitting apparatus has a base, said first and second coils are provided to said laser unit holder, and said magnet is provided to said base.

15. The laser line beam emitting apparatus of claim 12, wherein said laser line beam emitting apparatus has a base, said first and second coils are provided to said base, and said magnet is provided to said laser unit holder.

16. The Laser line beam emitting apparatus of claim 12, wherein the first winding pattern of said first conductive element and/or the second winding pattern of said second conductive pattern are formed in or on at least one substrate which comprises one or more layers.

* * * * *